United States Patent [19]

Yamauchi et al.

[11] Patent Number: 5,272,200
[45] Date of Patent: Dec. 21, 1993

[54] AQUEOUS DISPERSION AND SUBSTRATE COATED WITH THE SAME

[75] Inventors: Junnosuke Yamauchi; Akimasa Aoyama; Toshio Tsuboi; Satoshi Hirofuji; Takeshi Moritani, all of Kurashiki, Japan

[73] Assignee: Kuraray Co., Ltd., Kurashiki, Japan

[21] Appl. No.: 938,137

[22] PCT Filed: Feb. 13, 1992

[86] PCT No.: PCT/JP92/00144
§ 371 Date: Oct. 14, 1992
§ 102(e) Date: Oct. 14, 1992

[87] PCT Pub. No.: WO92/14785
PCT Pub. Date: Sep. 3, 1992

[30] Foreign Application Priority Data

Feb. 15, 1991 [JP] Japan ................................. 3-44282

[51] Int. Cl.$^5$ ............................................. C08L 29/04
[52] U.S. Cl. ..................................... 524/503; 524/557
[58] Field of Search ........................ 524/503, 528, 557

[56] References Cited

U.S. PATENT DOCUMENTS 3,547,845 12/1970 Pinkney .............................. 524/503

FOREIGN PATENT DOCUMENTS 58-15546 1/1983 Japan .
60-35061 2/1985 Japan .
60-96637 5/1985 Japan .
60-124661 7/1985 Japan .

Primary Examiner—Paul R. Michl
Assistant Examiner—Peter Szekely
Attorney, Agent, or Firm—Kramer, Brufsky & Cifelli

[57] ABSTRACT

An aqueous dispersion comprising a dispersoid of an ethylene-vinyl alcohol copolymer having an ethylene content of 15 to 65 mole % and a dispersion stabilizer of a saponified product of an ethylene-vinyl ester copolymer having an ionic group and having an ethylene content of 10 to 70 mole % and a saponification degree of at least 80%. According to the present invention, aqueous dispersions with high solid concentration and having excellent stability during storage or upon use. The film obtained by applying and then drying the aqueous dispersion has excellent gas barrier properties.

1 Claim, No Drawings

AQUEOUS DISPERSION AND SUBSTRATE COATED WITH THE SAME

BACKGROUND OF THE INVENTION

1. Field of the Invention

The present invention relates to an aqueous dispersion and, more specifically, to an aqueous dispersion of an ethylene-vinyl alcohol copolymer having excellent dispersion stability, and to a substrate coated with the same.

2. Description of the Prior Art

Ethylene-vinyl alcohol copolymers (hereinafter referred to as EVOH) prepared by saponification of ethylene-vinyl ester copolymers, particularly ethylene-vinyl acetate copolymer, have been attracting much attention as packaging materials and protective covering materials for plastic moldings, metal surfaces, papers, woods, etc. because of their superior barrier properties against gases such as oxygen and their good resistance to oils and chemicals.

In particular, high gas barrier properties are required for those films, sheets, laminates, hollow containers, etc. for packaging foods, that should prevent oxidation and maintain fragrance of the packaged contents. Plain articles comprising soft polyvinyl chloride, such as wall papers, coated fabrics and sheets, require a covering material to prevent the plasticizer used from bleeding out. It is then widely practiced to provide an EVOH layer having superior gas barrier properties, fragrance retention property and good resistance to oils and chemicals as the inner, outer, and/or intermediate layer of the articles to satisfy these requirements in a high degree.

Melt extrusion, injection molding and lamination are widely used for providing such an EVOH layer in general. It has been also proposed to provide an EVOH layer by applying a solution or aqueous dispersion of the EVOH and then drying it. This process has caught attention because of its ability to form a comparatively thin layer, and to coat easily hollow containers or the like having complex shapes and like advantages.

However, the process of applying an EVOH solution has the following problems. High concentration solutions cannot be applied because of their high viscosity. Since the solution uses an organic solvent such as dimethyl sulfoxide or a mixed solvent of water and a large amount of alcohol, the organic solvent used evaporates during film formation process and deteriorates the working environment or requires costly solvent recovery equipment. On the contrary, the process of applying an aqueous dispersion of EVOH is expected to be advantageous over the above described solution-applying process from the standpoint of working environment protection and economy.

For aqueous dispersions of EVOH, for example Japanese Patent Application Laid-open Nos. 101844/1979 and 61430/1981 disclose an emulsified dispersion of a conventional EVOH with a conventional surfactant or protective polymer colloid such as polyethylene oxide, carboxymethylcellulose, hydroxyethylcellulose or polyvinyl alcohol. Studies made by the present inventors have however revealed that the aqueous dispersion of EVOH obtained by these known processes are insufficient in dispersion stability and difficult to use for practical coating purposes.

Japanese Patent Application Laid-open No. 101844/1979 discloses that an aqueous EVOH dispersion is obtained by dispersing a what is known as random-copolymerized EVOH having carboxyl anion group obtained by terpolymerizing ethylene and vinyl acetate with a monomer having carboxylic group, such as acrylic acid or maleic anhydride, with a conventional surfactant as a dispersion stabilizer.

However, to assure sufficient dispersion of the what is known as the random copolymerized carboxyl anion-modified EVOH, it is necessary that a large amount of the carboxyl anion-containing monomer be copolymerized, because of the ionic group being randomly distributed throughout the entire EVOH. Presence of such large amount of the carboxyl anion reduces the crystallinity of the EVOH and increases the molecular structure turbulence, which tends to deteriorate the barrier property of the formed EVOH film.

DISCLOSURE OF THE INVENTION

An object of the present invention is to provide a superior dispersion stabilizing agent for dispersoids, in particular for EVOH. Another object of the present invention is to provide an aqueous dispersion of EVOH utilizing the above agent and capable of forming a film with superior gas barrier properties. Still another object of the present invention is to provide a substrate coated with the aqueous dispersion.

The objects can be achieved by dispersing EVOH with a dispersion stabilizer of an EVOH having ionic groups, especially an EVOH having randomly introduced ionic groups.

The first feature of the present invention is that the aqueous EVOH dispersion of the present invention has markedly improved dispersion stability during storage and upon use.

The second feature of the present invention is that the aqueous EVOH dispersion of the present invention, which has an excellent dispersion stability and causes almost no marked increase in the particle size during storage or upon use due to aggregation, can be applied to form a thin uniform coating, which exhibits, upon drying, superior gas barrier properties.

The dispersion stabilizer used in the present invention includes saponified products of ethylene-vinyl ester copolymers containing ionic groups and having an ethylene content of 10 to 70 mole % and a saponification degree of at least 80 mole % (hereinafter referred to as "ion-modified EVOH") and there is no particular limitation to the process for their preparation.

The ionic groups contained in the ion-modified EVOH used in the present invention include those ionic groups showing an ionic state when dissociated in water, that is, anionic groups, cationic groups and amphoteric groups. Anionic groups are preferable in view of dispersion stabilizing effect.

Suitable examples of the anionic groups include sulfonic acids and their salts, sulfuric acid esters and their salts, phosphoric acids and their salts and carboxylic acids and their salts. These acid groups and their salt groups may be contained at the same time. Sulfonic acid groups, carboxylic acid groups and their salt groups are preferred from the standpoint of dispersion stability and, particularly, sulfonic acid groups and their salt groups are most preferable.

Suitable examples of the cationic groups usable in the present invention include groups of amines and their salts, quarternary ammonium salts, phosphonium salts and sulfonium salts. In particular, quarternary ammonium salts are preferred because of excellent dispersion stability. Suitable examples of the amphoteric group include salts of aminocarboxylic acids (betaine type), salts of aminosulfonic acids (sulfobetaine type) and salts of aminosulfuric acid esters (sulfate betaine type).

The ionic group content in EVOH is suitably selected from a range that can produce desirable dispersion stabilizing effect. The preferred ionic group content based on the EVOH component in said ion-modified EVOH is in a range of 0.05 to 50 mole %, more preferably in a range of 0.1 to 30 mole %, and most preferably in a range of 0.2 to 10 mole %. Where the ionic group content is less than 0.05 mole %, the dispersion stabilizing effect is insufficient. Where the ionic group content is more than 50 mole %, the film obtained by applying the aqueous EVOH dispersion and then drying it has poor water resistance and gas barrier properties.

Other polymer component units containing no ionic groups may be incorporated into the ion-modified EVOH in an amount within limits not to deteriorate the desired dispersion stabilizing effect to a large extent.

The EVOH component of the ion-modified EVOH used in the present invention desirably has an ethylene content in a range of 10 to 70 mole % and a saponification degree of at least 80 mole % (the term "saponification degree" herein means that of vinyl ester component). The ethylene content is preferably at least 12 mole %, more preferably at least 15 mole %, most preferably at least 20 mole %. The upper limit is preferably 65 mole %, more preferably 60 mole %. The saponification degree is preferably at least 90 mole %, more preferably at least 95 mole %.

While the ethylene content and the saponification degree of the EVOH to be dispersed will be described later herein, it is desirable that the ethylene content and the saponification degree of the EVOH component of the ion-modified EVOH be of approximately the same order as those of the EVOH to be dispersed in view of dispersion stabilizing effect. Although there is no particular limitation to the polymerization degree of the ion-modified EVOH, it is preferably at least 100 in view of dispersion stabilizing effect. While there is no particular limitation to the upper limit of the polymerization degree, the polymerization degree is generally not more than 2000, because too high a polymerization increases the solution viscosity, resulting in poor dispersibility.

The polymerization degree of the ion-modified EVOH herein is obtained from the intrinsic viscosity determined on the ion-modified EVOH solution in a mixed solvent of an 1 mole/liter aqueous ammonium thiocyanate solution and phenol (weight ratio: 15 to 85 by weight) and at 30° C.

Any vinyl ester can be used insofar as it is copolymerizable with ethylene to give an ethylene-vinyl ester copolymer that can be hydrolyzed into polyvinyl alcohol. Examples of the vinyl ester include vinyl formate, vinyl acetate, vinyl propionate, vinyl benzoate, vinyl trifluoroacetate and vinyl pivalate. Vinyl acetate is particularly preferred in view of economy.

With respect to the structure of the ion-modified EVOH, those having introduced the ionic groups in the state of what is known as random distribution are preferably employed. There is no particular limitation to the preparation process of such ion-modified EVOH'S.

For example, there are available a process which comprises copolymerizing a monomer containing an ionic group with ethylene and vinyl ester by radical polymerization to give a copolymer and hydrolyzing the vinyl ester units of the obtained copolymer into vinyl alcohol units; a process which comprises introducing a component having an ionic group into EVOH polymer by addition reaction; and a process which comprises introducing a component having an ionic groups into an ethylene-vinyl ester copolymer by addition reaction and then hydrolyzing the vinyl ester units of the obtained copolymer into vinyl alcohol units. These polymerization, hydrolysis, addition reaction, etc. can be carried out by any of known methods.

With respect to the monomer containing an ionic group to be copolymerized with ethylene and vinyl ester, there can be used any monomer containing an ionic group or a group convertible to an ionic group and being radical-homopolymerizable or radical-copolymerizable. Examples of such monomers will be described below.

MONOMER CONTAINING AN ANIONIC GROUP

Examples of monomers containing a sulfonic acid anionic group include (meth)acrylamide-based sulfonic acid salt monomers such as sodium 2-(meth)acrylamide-2-methylpropanesulfonate, styrene-based sulfonic acid salt monomers such as potassium styrenesulfonate, allylic sulfonate monomers such as sodium allylsulfonate, vinyl sulfonic acid salts such as sodium vinylsulfonate, ammonium salts of the foregoing, and further acid type monomers of the foregoing. Esters of these sulfonic acids can also be used upon conversion of the ester groups to the corresponding salt or acid groups after polymerization.

Examples of monomers containing a carboxylic acid anionic group include mono-, di-, polycarboxylate type vinyl monomers such as acrylic acid, methacrylic acid, maleic anhydride, itaconic acid and fumaric acid, and alkali metal salts and ammonium salts of the foregoing. Esters of the foregoing can also be used upon conversion of the esters to the corresponding salts after polymerization.

MONOMER CONTAINING A CATIONIC GROUP

Examples of monomers containing a cationic group include (meth)acrylamide type monomers containing an amino group such as aminopropyl acrylamide and aminopropyl methacrylamide, (meth)acrylate type monomers containing an amino group such as aminoethyl acrylate and aminoethyl methacrylate, and salt type monomers thereof. These monomers are preferable in view of polymerizability. In particular, the quarternary salt type monomers are more preferable in view of little or no discoloration of the resulting polymers and their examples include trimethylacrylamide propyl ammonium chloride and triethylmethacroylethyl ammonium bromide.

These monomers can be used alone or in combination. Other monomers can also be copolymerized in amounts not to deteriorate the desired dispersion stabilizing effect.

Examples of addition reaction to EVOH include the Michael addition reaction of a vinyl monomer containing an ionic group to the hydroxyl groups of EVOH, acetalization or ketonization by aldehyde or ketone containing an ionic group, addition reaction of an epoxy compound containing an ionic group, addition reaction of a carboxylic acid anhydride, esterification by sulfuric acid and so forth. There is also mentioned introduction by radical addition reaction of monomers containing an ionic group and having a low radical-homopolymerizability such as maleic hydride.

It is also possible to prepare an addition product of an ethylene-vinyl ester copolymer and a monomer containing an ionic group and having a low radical-homopolymerizability, such as maleic anhydride, by radical addition reaction and then hydrolyzing the vinyl ester units of the obtained addition product into vinyl alcohol units.

While EVOH's having a randomly introduced ionic groups are, as described above, preferably used as the EVOH containing an ionic group used in the present invention, EVOH's having an ionic group at the molecular end are also usable. The term "EVOH's having an ionic group at the molecular end" herein means EVOH's having an ionic group at the molecular end and having a polymerization degree (obtained from the intrinsic viscosity determined on its solution in a 15/85 by weight mixed solvent of a 1 mole/liter aqueous ammonium thiocyante solution and phenol) at 30° C. of at least 100, an ethylene content of 10 to 70 mole % and a saponification degree of at least 80 mole %. The EVOH's having an ionic group at the molecular end will be further described later herein.

The EVOH to be dispersed in the present invention is an EVOH prepared by copolymerizing ethylene and a vinyl ester such as vinyl acetate, vinyl formate, vinyl propionate, vinyl benzoate, vinyl trifluoroacetate or vinyl pivarate, and then hydrolyzing the obtained polyvinyl ester. It is necessary that the EVOH have an ethylene content of 15 to 65 mole % and a saponification degree of at least 90 mole %. If the ethylene content of an EVOH as dispersoid is less than 15 mole %, the stability of its aqueous dispersion will deteriorate. If the ethylene content is more than 65 mole %) the resulting film will have poor gas barrier properties.

From the viewpoint of the stability of aqueous dispersion and gas barrier properties of the resulting film, the ethylene content of the EVOH to be dispersed is more preferably 20 to 55 mole %. EVOH's having a saponification degree of at least 90 mole % should be used as the dispersoid of the aqueous dispersion of the present invention, because otherwise the resulting film will have poor gas barrier properties. Higher saponification degree of EVOH for dispersoid assures higher gas barrier properties of the resulting film. The saponification degree is therefore more preferably at least 95 mole % and most preferably at least 97 mole %.

The polymerization degree of the EVOH as the dispersoid in accordance with the present invention can be selected according to the applications. However, it is preferably at least 400, more preferably at least 700, because EVOH's with too low a polymerization degree gives films with inferior strength. EVOH's having a higher polymerization degree-are more advantageous when used for aqueous dispersions for coating purpose, and usually EVOH's having a polymerization of up to 5,000 can be employed.

The polymerization degree of an EVOH as dispersoid herein is obtained from the intrinsic viscosity determined on its solution in a 15/85 by weight mixed solvent of water and phenol at 30° C. Minor amounts up to 5 mole % of other copolymerisable monomers except ethylene and vinyl ester may, if necessary, be copolymerized.

The amount of the ion-modified EVOH used as a dispersion stabilizer in the present invention is suitably selected depending on the type and content of the ionic group, and is generally in a range of 2 to 200 parts by weight based on 100 parts by weight of the EVOH to be dispersed, more preferably 3 to 100 parts by weight on the same basis, and most preferably 5 to 50 parts by weight on the same basis. If the amount of the ion-modified EVOH is too small, the dispersion stability of aqueous dispersion will be low. If the amount is too large, the resulting film formed from the aqueous dispersion will have insufficient gas barrier properties.

There is no particular limitation to the process for dispersing EVOH using the ion-modified EVOH as a dispersion stabilizer, and conventional processes can be employed.

For example, an EVOH solution in a solvent is, with stirring, contacted with water, which is non-solvent for EVOH, in the presence of a dispersion stabilizer of an ion-modified EVOH, to form EVOH fine particles having a diameter of not more than 3 $\mu$m, preferably not more than 2 $\mu$m, more preferably not more than 1 $\mu$m. The solvent is then removed off to obtain the desired aqueous dispersion. The "diameter of fine particles" herein represents the number average diameter of the fine particles.

The solid content of the aqueous dispersion of the present invention can be suitably selected according to the intended use. The present invention is characterized by the capability of producing stable aqueous dispersions having a high solid concentration. The solid concentration of the aqueous dispersion of the present invention is preferably at least 10% by weight, more preferably at least 15% by weight, and most preferably at least 20% by weight.

Although there is no particular limitation to the upper limit of the solid concentration, an aqueous dispersion with too high a concentration sometimes tends to have poor dispersion stability when allowed to stand for a long period of time. The upper limit of the solid concentration is therefore preferably not more than 60% by weight, more preferably not more than 50% by weight, and most preferably not more than 40% by weight.

Examples of the solvent used to dissolve EVOH are monohydric alcohols such as methyl alcohol, ethyl alcohol, propyl alcohol and butyl alcohol, dihydric alcohols such as ethylene glycol and propylene glycol, trihydric alcohols such as glycerin, phenols such as phenol and cresol, amines such as ethylenediamine and trimethylenediamine, dimethyl sulfoxide, dimethylacetamide, N-methylpyrrolidone and the like, and the hydrates of the foregoing. These solvents can be employed singly or in combination. Particularly preferred solvents are mixed solvents of water-alcohol type, such as water-methyl alcohol, water-normal propyl alcohol and water-isopropyl alcohol.

The ion-modified EVOH employed in the present invention as a dispersion stabilizer may, before dispersion operation, be present either in the dispersoid EVOH solution or in water used as the non-solvent, or both in the dispersoid EVOH solution and water. Preferably, however, the ion-modified EVOH is allowed to be present in the dispersoid EVOH solution.

The organic solvent in the solution can, after dispersion operation, be removed by any of suitable conventional processes, such as distillation, extraction or dialysis. It is preferably to remove the solvent as completely as possible, but the solvent may remain in a minor amount in view of economy.

Another process for preparing the aqueous dispersion of the present invention comprises heat-dissolving an EVOH as a dispersoid and an ion-modified EVOH as a dispersion stabilizer in a solvent that can dissolve EVOH at high temperatures but cannot dissolve it at low temperatures, then cooling the solution to produce EVOH fine particles, and then replacing the solvent by water.

As the above solvent that dissolves EVOH at high temperatures and permits it to precipitate at lower temperatures, there can be used alcohols singly or in combination with water as a mixed solvent and the like.

Still another process comprises contacting with a non-solvent or cooling an EVOH solution containing an ion-modified EVOH in combination, to precipitate particles, collecting the particles by filtration and then dispersing them, together with the ion-modified EVOH, in water.

In the present invention, a preferable process for preparing an aqueous dispersion comprises the successive steps of:

dissolving a dispersoid EVOH and a dispersion stabilizer ion-modified EVOH in a common solvent such as a mixed water-alcohol solvent with stirring at 50° to 75° C. to obtain an EVOH solution, cooling the solution down to −10° to 30° C. to obtain EVOH fine particles, removing the alcohol under a reduced pressure of 10 to 150 mmhg at a temperature of 10° to 30° C., and removing the required amount of water to obtain an aqueous dispersion with the desired solid concentration.

It is acceptable, for the purpose of reducing the viscosity of the aqueous dispersion, to add a compound selected from the group consisting of alkali metal compounds such as sodium hydroxide, sodium chloride, sodium acetate, sodium sulfate and sodium nitrate, alkali earth metal compounds such as calcium hydroxide, calcium chloride, calcium acetate, calcium sulfate and calcium nitrate, and other electrolytes, in an amount of 0.01 to 0.5% by weight based on the polymer weight. The addition may be conducted either before or after formation of fine particles from the dispersoid EVOH.

The aqueous dispersion thus obtained of the present invention is useful as a coating material for forming films with superior gas barrier properties, and can also be used, utilizing its superior mechanical and chemical characteristics, for spray drying for preparing atomized fine powders, as a binder or a vehicle for paints and adhesives, and for like purposes.

The aqueous dispersion of the present invention may incorporate a conventional surfactant, protective colloid, etc. within limits not to interfere achievement of the object of the present invention. Similarly, the aqueous dispersion of the present invention may also incorporate an aqueous dispersion of other resins, stabilizers to light, heat, etc., pigments, lubricants, mildew proofing agents, auxiliaries to facilitate film formation and the like. The dispersion stabilizer used in the present invention is, while being suited for stabilizing EVOH dispersions, also usable for stabilizing dispersions of other organic materials (resins) and inorganic materials.

Other embodiments of the present invention will be described next.

OTHER EMBODIMENT (1)

Among the above-described ion-modified EVOH's, those containing randomly introduced sulfonic acid anionic groups in an amount of 0.05 to 10 mole %, having an ethylene content of 15 to 65 mole % and being insoluble in water at room temperature can be used also as dispersoids, to give aqueous dispersions of what are known as self-dispersion type. This fact is apparent from Examples 2-1 and 2-2 described later herein.

The phrase "insoluble in water at room temperature" herein means that at least 50% of the EVOH remains undissolved when it has been stirred in water in an amount of 100 times its weight at 30° C. for 1 day. In this case, the content of insoluble matter is higher, the better; and preferably it is in an amount of at least 80%, and more preferably at least 90%.

It is necessary that the content of sulfonic acid anionic groups be in a range of 0.05 to 10 mole % based on the moles of the EVOH component in the anion-modified EVOH in view of dispersion stabilization effect, and be also within a range to assure that the resulting EVOH is insoluble in water at room temperature. The content is preferably in a range of 0.1 to 5 mole %, and more preferably in a range of 0.3 to 3 mole %. If the content is less than 0.05 mole %, the dispersion stability will become low. If the content is more than 10 mole %, the resulting modified EVOH will have too strong affinity with water and the dispersion stability will deteriorate.

Other components containing no ionic group may be incorporated into the ion-modified EVOH within limits not to deteriorate the dispersion stabilization effect to a large extent.

It is necessary that the anion-modified EVOH have an ethylene content in a range of 15 to 65 mole % and a saponification degree of at least 90 mole %. Where the ethylene content of EVOH component is less than 15 mole %, the resulting aqueous dispersion has poor dispersion stability. With the ethylene content exceeding 65 mole %, the resulting film has poor gas barrier properties. The ethylene content is preferably in a range of 20 to 55 mole % in view of the stability of the aqueous dispersion and the gas barrier properties of the resulting film.

If the saponification degree of EVOH component is less than 90 mole %, the resulting film will have poor gas barrier properties. The saponification degree therefore should be at least 90 mole %. The saponification degree of EVOH constituent is higher, the better the gas barrier properties of the resulting film. The saponification degree is preferably at least 95 mole %, and more preferably at least 97 mole %.

The polymerization degree of the anion-modified EVOH can be selected according to the intended use, and it is usually at least 400, preferably at least 700. Too low a polymerization degree causes the resulting film formed to have an unacceptably low strength. Anion-modified EVOH's with higher polymerization degree are more advantageously used for aqueous dispersions for application purposes and those having a polymerization degree of up to 5,000 can be employed normally. The anion-modified EVOH may, as required, incorporate minor amounts up to 5 mole % of other copolymerizable monomers ethylene, the vinyl ester used and the sulfonic acid anionic monomer.

There is no particular limitation to the dispersion process for the above sulfonic acid anion-modified EVOH, and any of conventional processes can be used.

For example, an ion-modified EVOH solution in a solvent is, with stirring, contacted with water, which is non-solvent for EVOH, to precipitate EVOH fine particles having a diameter of not more than 3 μm, preferably not more than 2 μm, more preferably not more than 1 μm. The solvent is then removed off to obtain the desired aqueous dispersion. Processes as described before are also usable.

The solid concentration of the aqueous dispersion is suitably selected according to the intended use. The present invention is characterized by the capability of producing stable aqueous dispersions having a high solid concentration. The solid concentration is preferably at least 10% by weight, more preferably at least 15% by weight, and most preferably at least 20% by weight. Although there is no particular limitation to the upper limit of the solid concentration, an aqueous dispersion with too high a concentration sometimes tends to have poor dispersion stability when allowed to stand for a long period of time. The upper limit of the solid concentration is therefore generally preferably not more than 60% by weight, more preferably not more than 50% by weight, and most preferably not more than 40% by weight.

Solvents as described before can also be employed here.

The aqueous dispersion thus obtained as Other Embodiment (1) is useful as a coating material for forming films with high gas barrier properties and can also be used, utilizing its superior mechanical properties and chemical characteristics, for other purposes such as spray drying for preparing atomized fine powders, as a binder or a vehicle for paints and adhesives.

OTHER EMBODIMENT (2)

Among the ion-modified EVOH's described before, those having an ionic group at their molecule end are, acting also as dispersoid, usable for preparing aqueous dispersions of self-dispersion type. This fact will be clearly shown in Examples 3-1 through 3-3 described later herein. The same processes as those for Other Embodiment (1) are employed to disperse in water the EVOH having an ionic group at the molecular end.

Here, examples of the EVOH having an ionic group at the molecular end are hydrolyzed products of ethylene-vinyl ester copolymers having an ionic group at an end of the molecule, having a polymerization degree of at least 400, an ethylene content of 15 to 65 mole % and a saponification degree of at least 90 mole %, and being insoluble in water at room temperature (hereinafter referred to as "terminal-ion-modified EVOH").

Determination of the presence of an ionic group at the molecular end can be made by NMR (nuclear magnetic resonance) analysis. As described before, the phrase "insoluble in water at room temperature" herein means that at least 50% of the EVOH remains undissolved when it has been stirred in water in an amount of 100 times its weight at 30° C. for 1 day. In this case, the content of insoluble matter is higher, the better; and preferably it is in an amount of at least 80%, and more preferably at least 90%.

The ionic group herein means a group that exhibits ionic character in water. Examples of the ionic group include sulfonic acid ionic groups and salts thereof, carboxylic acid ionic groups and salt thereof and ammonium ionic groups. These ionic groups can be used singly or in combination of two or more. Minor amounts of monomer components copolymerizable with ethylene and vinyl ester may, as described before, be incorporated in the EVOH within limits not to impair the purpose of the present invention.

The polymerization degree of the terminal-ion-modified EVOH can be selected according to the intended use, and it is usually at least 400, preferably at least 700. Too low a polymerization degree causes the resulting film formed to have an unacceptably low strength. Terminal-ion-modified EVOH's with higher polymerization degree are more advantageously used for aqueous dispersions for application purposes and those having a polymerization degree of up to 5,000 can be employed normally.

The EVOH having a sulfonic acid ionic group or the salts thereof, a carboxylic acid ionic group or the salt thereof, an ammonium ion group or the like at the molecular end can be prepared by a variety of processes. Examples of such processes include one which comprises copolymerizing ethylene and vinyl ester in the presence of, as a chain transfer agent, a compound having an functional group such as an alcohol, aldehyde or thiol having a sulfonic acid ion group or salts thereof, a carboxylic acid ionic group or salts thereof, an ammonium group or the like, and then hydrolyzing the vinyl ester units of the obtained copolymer; and one which comprises introducing by chemical reaction a sulfonic acid group or salts thereof, a carboxylic acid group or salts thereof, an ammonium group or the like into the molecular end of EVOH. Preferred among these processes is one which comprises copolymerizing ethylene and vinyl ester in the presence of a thiol having a sulfonic acid ionic group or salts thereof, a carboxylic acid ionic group or salts thereof, an ammonium group or the like, and then hydrolyzing the obtained copolymer. This process can introduce the ionic group into the molecular end economically and efficiently, thereby producing EVOH's having excellent aqueous dispersion stability.

Copolymerization of ethylene and vinyl ester can be carried out by any of conventional processes such as solution polymerization, suspension polymerization or emulsion polymerization in batch, semi-batch or continuous system in the presence of a polymerization initiator. Among these processes, solution polymerization in the presence of an alcohol is most suitable for commercial production.

With solution polymerization, the solvent concentration is usually in a range of 0 to 50%, preferably in a range of 3 to 30% and the conversion is usually in a range of 20 to 80%, preferably in a range of 30 to 60%. The polymerization temperature is usually in a range of 20° to 100° C., preferably in a range of 40° to 80° C. Examples of usable radical polymerization initiators include nitriles such as 2,2'-azo-bisisobutyronitrile, 2,2'-azobis-(2,4-dimethylvaleronitrile) and 2,2'-azobis-(4-methoxy-2,4-dimethylvaleronitrile), carbonates such as di-normal-propyl peroxycarbonate, bis-4-tertiary-butyl-hexyl peroxydicarbonate and bis-2-ethylhexyl peroxycarbonate, peroxides such as benzoyl peroxide, lauroyl peroxide and acetylcyclohexanesulfonyl peroxide. Examples of the alcohol used in the solution polymerization include lower alcohols such as methyl alcohol, ethyl alcohol, propyl alcohol and butyl alcohol, among which methyl alcohol is most preferable in view of economy.

Upon copolymerization of ethylene and vinyl ester in the presence of a thiol having a sulfonic acid group or salts thereof, carboxylic acid group or salts thereof, an ammonium group or the like, the amount of the thiol added to the polymerization zone and the process for the addition may be relevantly selected. The thiol acts as a chain transfer agent and the amount and process of its addition to the polymerization zone, which influence the degree of polymerization, the distribution thereof and the like of the polymer obtained, are suitably selected according to the demanded dispersion stability of the terminal-ion-modified EVOH, the strength of the film formed therefrom and like factors. It is preferable, for the purpose of introducing the ionic group into the molecular end efficiently and obtaining the modified EVOH having excellent qualities, to keep the amount of the thiol in the reaction zone from fluctuating to a large extent. This is accomplished by adding the thiol in such a rate as to conform to the reaction rates of the vinyl ester and ethylene in the polymerization zone.

Various kinds of thiols containing a sulfonic acid ion or salts thereof, a carboxylic acid ion or salts thereof, an ammonium group or the like salt can be used.

Examples of the thiol containing a sulfonic acid group or salts thereof include those represented by the following general formulas 1 to 3, wherein n represents an integer of 1 to 4, $R^1$ to $R^8$ each independently represents a methyl group or a hydrogen atom, and M represents a hydrogen atom or an alkali metal atom.

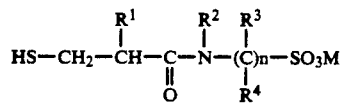
(1)

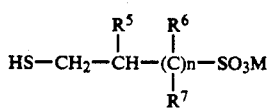
(2)

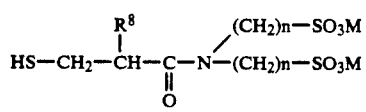
(3)

Examples of the thiol having a carboxylic acid group or salts thereof include those represented by the following general formula 4 and 5, wherein n represents an integer of 0 to 4, $R^9$ to $R^{11}$ represent each independently a hydrogen atom or a lower alkyl group which may be substituted, M represents a hydrogen atom, an alkali metal atom or an ammonium group.

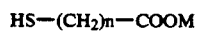
(4)

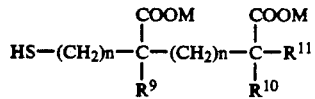
(5)

Examples of the thiol having an ammonium group include the following general formulas 6 through 9, wherein n represents 0 or an integer of 1 to 3, m represents an integer of 1 to 10, $R^{12}$, $R^{13}$, $R^{16}$, $R^{17}$ and $R^{18}$ represent each independently a hydrogen atom or a methyl group, and $R^{14}$ and $R^{15}$ represent each a lower alkyl group which may be substituted and A represents a group that links the nitrogen atom of amine or ammonium to either the nitrogen atom of the amido group of the formula 6 or the oxygen atom of the formula 8.

A quarternary compound of (6)

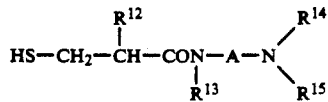

A quarternary compound of (7)

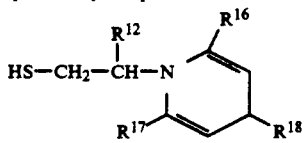

A quarternary compound of (8)

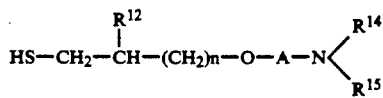

A quarternary compound of (9)

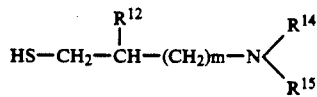

The vinyl ester used herein includes those copolymerizable with ethylene to gives copolymers and convertible to vinyl alcohol units by saponification of the copolymers. Examples of the vinyl ester include vinyl formate, vinyl acetate, vinyl propionate, vinyl benzoate, vinyl trifluoroacetate and vinyl pivarate, among which vinyl acetate is most preferred in view of economy.

The ethylene-vinyl ester copolymer having an ionic group at the molecular end and obtained by copolymerization is then subjected to saponification reaction. The saponification reaction is advantageously carried out by a known process, i.e. one comprising preparing a solution of the copolymer in alcohol and then conducting alcoholysis in the presence of an alkaline catalyst. A particularly preferred process as disclosed in Japanese Patent No. 575,889 (Japanese Patent Publication No. 14958/1968 and Japanese Patent No. 611,557 (Japanese Patent Publication No. 40547/1970 comprises, while using a tower-type reactor, removing methyl acetate formed as a byproduct during the saponification reaction from the top of the tower by blowing alcohol vapor from the bottom of the tower. Examples of the alkaline catalyst include alkali metal hydroxides such as sodium hydroxide and potassium hydroxide, and alcoholates such as sodium methylate and potassium methylate, among which sodium hydroxide is most preferable in respect of economy.

The saponification reaction temperature is suitably selected from a range of 60° to 175° C. In particular, where the above tower type reactor is used, a saponification temperature of at least 100° C. is, although depending on the composition of the formed copolymer, preferably employed in respect of shortening the reaction period, good solubility of EVOH in the alcohol and the like.

After the completion of saponification reaction, the terminal-ion-modified EVOH is isolated by any of known processes. Particularly preferred is the process disclosed in Japanese Patent No. 725,520 (Japanese Patent Publication No. 38634/1972), which comprises precipitating the modified EVOH in the form of strands. The terminal-ion-modified EVOH thus separated is washed in the usual manner, thereafter, if necessary, treated with a conventional heat stabilizing process such as acid treatment and then dried.

The modified EVOH thus obtained, which contains an ionic group at the molecular end, has the feature of maintaining the structure of EVOH little disturbed, thereby maintaining high gas barrier properties. The modified EVOH also has the features of easy dispersibility in water, applicability to form thin, uniform films and superior gas barrier properties of the resulting dried film.

OTHER EMBODIMENT (3)

In the present invention, there is also another embodiment comprising a self dispersible type aqueous dispersion of a copolymer as dispersoid comprising 100 parts by weight of a saponified product of an ethylene-vinyl acetate copolymer component (A) combined with 20 to 30 parts by weight of block- or graft-copolymerized polyether component (B) and being insoluble in water at room temperature. The saponified product has an ethylene content of 20 to 60 mole % and a saponification degree of at least 95 mole %. This fact is clear from Examples 4-1 and 4-2 to be described later herein. The same emulsification and dispersion processes as employed in the afore-described Other Embodiment (1) are also used here. The EVOH used here includes EVOH-based block or graft copolymers which comprise component (A) and component (B) combined with each other in the form of blocks or grafts and are insoluble in water at room temperature (hereinafter referred to as "polyether-modified EVOH" as a generic designation and distinguished by adding thereto "block copolymer" or "graft copolymer"). There is no particular limitation to the process for their production. As repeatedly described before, the phrase "insoluble in water at room temperature" herein means that at least 50% of the EVOH remains undissolved when it has been stirred in water in an amount of 100 times its weight at 30° C. for 1 day. In this case, the content of insoluble matter is higher, the better; and preferably it is in an amount of at least 80%, and more preferably at least 90%.

The EVOH component (A) of the polyether-modified EVOH is obtained by copolymerizing ethylene and a vinyl ester such as vinyl formate, vinyl acetate, vinyl propionate, vinyl benzoate, vinyl trifluoroacetate or vinyl pivarate, in particular vinyl acetate, and then saponifying the obtained copolymer. The EVOH component should have an ethylene content in a range of 20 to 60 mole % and a saponification degree of at least 95 mole %. If the ethylene content is less than 20 mole %, the aqueous dispersion will have poor stability. If the ethylene content is more than 60 mole %, the gas barrier properties of the film formed therefrom will be poor. The ethylene content is preferably in a range of 20 to 55 mole % in view of stability of the aqueous dispersion and the gas barrier properties of the resulting film. If the saponification degree is less than 95 mole %, the gas barrier properties of the resulting film will unsatisfactorily decrease. The saponification degree is preferably at least 97%, more preferably at least 99 mole %.

The EVOH component may incorporate minor amounts of monomer component (as described before) copolymerizable with ethylene and vinyl ester within limits not to impair the purpose of the present invention.

Examples of the polyether component (B) of the polyether-modified EVOH used in the present invention, which will be described later in detail, include those principally comprising an oxyalkylene unit such as oxyethylene unit, oxypropylene unit or oxytetramethylene unit, among which particularly preferred are those principally comprising oxyethylene unit preferable in view of stability of the resulting aqueous dispersion. The polyether may incorporate in the molecule thereof other groups such as polymethylene unit, amide groups, urethane groups, ester groups and phenyl groups.

It is necessary that the content of polyether component (B) should be 2 to 30 parts by weight based on 100 parts by weight of EVOH component (A). If the content of the polyether component (B) is less than 2 parts by weight, the aqueous dispersion will have too low a stability to be usable. If the content of the polyether component (B) is more than 30 parts by weight, the gas barrier properties of the resulting film will decrease. The content of polyether component (B) is preferably in a range of 5 to 20 parts by weight on the above basis.

The polymerization degree of the polyether-modified EVOH used in the present invention can be selected according to the intended use, but it is generally at least 400, preferably at least 700, because too low a polymerization degree causes the film formed to have an unacceptably low strength. Higher polymerization degree is more advantageous upon coating an aqueous dispersion of the ether-modified EVOH. Generally polyether-modified EVOH's having a polymerization degree of up to 5,000 can be used. The polymerization degree of the polyether-modified EVOH used in the present invention herein is determined by viscosity measurement in the same manner as for conventional EVOH.

There is no particular limitation to the process for producing the polyether-modified EVOH and its examples are described below.

(A) Polyether-modified EVOH block copolymer (i) Ethylene and a vinyl ester are radical-copolymerized in the presence of a polyether having a thiol group at the molecular end, to give a block copolymer comprising the polyether and the ethylene-vinyl ester copolymer. The block copolymer thus obtained is then saponified to give a block copolymer comprising the polyether and EVOH in which the vinyl ester units have been converted to vinyl alcohol units, linked to each other via sulfur atom (S).

The polyether having a thiol group at the molecular end can be prepared by addition reaction of a thiocarboxylic acid such as thioacetic acid and a polyether having a double bond at the molecular end in the presence of a peroxide such as benzoyl peroxide, to obtain a polyether having a thioester group at the molecular end, and then saponifying the polyether to convert the terminal thioester group to thiol group.

(ii) Conversely, ethylene and a vinyl ester are radical-copolymerized in the presence of a thiocarboxylic acid such as thioacetic acid, to give an ethylene-vinyl ester copolymer having a thioester group at the molecular end. The copolymer thus obtained is saponified to give an EVOH having a thiol group at the molecular end. This modified EVOH is radical-copolymerized with a polyether having a double bond at the molecular end, to give a block copolymer of the polyether and the EVOH linked through sulfur atom (S).

(B) Polyether-modified EVOH graft copolymer (a) A polyether having a double bond at the molecular end, ethylene and a vinyl ester are radical-copolymerized, and the obtained copolymer is saponified, to give a polyether-modified EVOH graft copolymer comprising the polyether grafted to the EVOH.

(b) EVOH is radical-copolymerized with a polyether having a polymerizable double bond by a conventional process such as one of irradiating radial ray or ultraviolet ray or one comprising adding a peroxide, to give a polyether-modified EVOH graft copolymer comprising the polyether grafted to the EVOH.

The polyether having a double bond at the molecular end herein includes those represented by the following formulas (10) through (14).

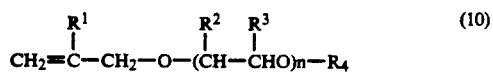
(10)

(11)

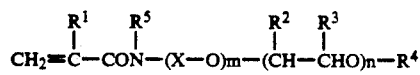
(12)

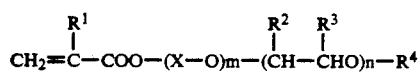
(13)

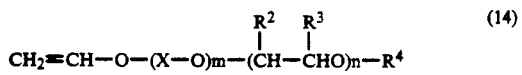
(14)

wherein $R^1$ represents a hydrogen atom or a methyl group, $R^2$, $R^3$ and $R^5$ represent each independently a hydrogen atom or an alkyl group having 1 to 10 carbon atoms, $R^4$ represents a hydrogen atom, an alkyl group having 1 to 10 carbon atoms, an alkyl ester (with its alkyl group having 1 to 10 carbon atoms), an alkylamide (with its alkyl group having 1 to 10 carbon atoms) or the like, X represents an alkylene group having 1 to 10 carbon atoms, a substituted alkylene group, a phenylene group or a substituted phenylene group, n is an integer of 1 to 100 and m is 0 (zero) or an integer of 1 to 20.

The polyether-modified EVOH can be prepared by a variety of processes. Here, the efficiency of formation of the block or graft type polyether-modified EVOH is theoretically not 100% because there unavoidably form polyether homopolymer and EVOH homopolymer as by-products. Although the formation efficiency of the polyether-modified EVOH is higher the better, it is usually difficult to strictly separate out the byproducts homopolymers by side reactions. The EVOH homopolymer is also useful as a dispersoid, and the polyether homopolymer is not necessarily removed off when its amount is not so large. Therefore, the polyether-modified EVOH as it contains minor parts of the homopolymers can be dispersed.

Accordingly, the polyether-modified EVOH used in the present invention includes the entire reaction product upon grafting or blocking reaction and containing the byproducts homopolymers of EVOH and polyether. The block or graft ratio of the polyether component as referred to in the present invention means the ratio of the apparent amount by weight of the block or graft component including the homopolymer (polyether) to the amount by weight of EVOH component including the homopolymer (EVOH). However, the homopolymers, particularly the homopolymer of polyether component, is preferably contained in as low an amount as possible, and may be removed as needed.

Aqueous dispersions containing, as dispersoid, the thus prepared EVOH having a polyether component have markedly improved dispersion stability during storage and upon use. Another large advantage of the aqueous dispersions is that the particle size is very small because the particles originally obtained are very small and that the superior stability of the aqueous dispersions causes little or no appreciable increase in particle size due to aggregation during storage or upon use. Due to this advantage, the aqueous EVOH dispersions of the present invention have excellent film formability and can be applied into a thin homogeneous coating, thereby assuring that the film that forms after drying has superior gas barrier properties.

Although the mechanism is not quite clear, it is attributable to the effects produced by polyether component being linked to EVOH component in the state of blocks or grafts. The polyether component effectively helps stabilize the particles and does not interfere the crystallinity of EVOH component to a large extent, which different from the case of random copolymer. The polyether component further effectively helps fuse the emulsified and dispersed particles to each other upon film formation, thereby contributing to creation of high barrier properties.

BEST MODE FOR CARRYING OUT THE INVENTION

The present invention is more particularly explained by means of the following Examples, which are provided herein for purposes of illustration only and are not intended to be limiting unless otherwise specified. In the Examples, "parts" means "parts by weight" unless otherwise noted. The compositions of solvent are also expressed on the basis of weight.

EXAMPLE 1

There was used a sulfonic acid anion-modified EVOH having random-copolymerized 1.2 mole % based on the mole of EVOH component of sodium 2-acrylamide-2-methylpropanesulfonate, the EVOH component having an ethylene content of 33 mole %, a saponification degree of 99.6 mole % and a polymerization degree of 800. Fifty (50) parts of a 10% solution of the modified EVOH in a 50/50 mixed solvent of water/methyl alcohol was added to 28 parts of a conventional EVOH having an ethylene content of 32 mole %, a saponification degree of 99.5% and a polymerization degree of 1,000, 100 parts of methanol and 100 parts of water, and the mixture was dissolved by heating at 65° C.

The solution was then cooled to 10° C. with stirring to give a stable dispersion containing fine particles that formed. The average particle size was found to be 0.7 μm. Then, the methyl alcohol was distilled off from the dispersion under reduced pressure with stirring at 20° C. There was found little or no aggregation of particles during the distillation process, and an aqueous dispersion having a solid concentration of 26% with an average particle size of 0.7 μm was obtained. The obtained aqueous dispersion showed superior stability when allowed to stand. There was found little or no aggregation upon standing test at 40° C. for 10 days.

The aqueous dispersion was applied on a primer-coated surface of a biaxially oriented polypropylene film (with a film thickness of 20 μm) and dried at 110° C. for 5 minutes to give a coated film (with an EVOH layer thickness of 3 μm). The oxygen barrier property of the film was measured at 20° C., 0% RH, to show an oxygen permeability of 3.0 cc/m²·day·atm, which is good for food packaging material. (Hereinafter, the same measuring conditions and unit of oxygen permeability will apply.)

COMPARATIVE EXAMPLE 1 THROUGH 6

Example 1 was repeated except that:

only the conventional EVOH was dispersed without using the sulfonic acid anion-modified EVOH (Comparative Example 1);

the anion-modified EVOH was replaced by the usual nonionic surfactant of nonylphenylether ethylene oxide adduct as a dispersion stabilizer (Comparative Example 2);

the same was replaced by an anionic surfactant of sodium dodecylbenzenesulfonate as a dispersion stabilizer (Comparative Example 3);

the same was replaced by a polymer protective colloid of a partially saponified polyvinyl alcohol having a saponification degree of 80 mole % and a polymerization degree of 600 as a dispersion stabilizer (Comparative Example 4); or the same was replaced by a sulfonic acid anion-modified polyvinyl alcohol having a saponification degree of 80 mole % and a polymerization degree of 600 having random-copolymerized sodium 2-acrylamide-2-methylpropanesulfonate in an amount of 6 mole %, as a dispersion stabilizer (Comparative Example 5).

In all cases, when the solutions obtained by dissolving by heating were cooled with stirring, the particles that formed aggregated so that aqueous dispersions could not be obtained.

An EVOH having an acrylic acid component content of 2.5 mole %, an ethylene content of 33 mole %, a saponification degree of 99.6 mole % and a polymerization degree of 800 was obtained by terpolymerization of acrylic acid, ethylene, and vinyl acetate, followed by saponification of the obtained copolymer. Example 1 was repeated except that the sulfonic acid anion-modified EVOH of Example 1 was replaced by the thus obtained EVOH and that sodium dodecylbenzene-sulfonate was used in an amount of 1% by weight based on the weight of the thus obtained EVOH, to obtain an aqueous dispersion having an average particle size of 1.0 μm and a solid concentration of 20%. A little aggregation was observed when the obtained aqueous dispersion was allowed to stand at 40° C. for 10 days. The aqueous dispersion was applied and dried in the same manner as in Example 1 to obtain a film (with an EVOH layer thickness of 31 μm). The oxygen permeability of the obtained film was found to be 14 (Comparative Example 6).

EXAMPLE 2

There was used an anion-modified EVOH having random-copolymerized 0.3 mole % based on the mole of EVOH component of potassium 2-acrylamide-2-methylpropanesulfonate, the EVOH component having an ethylene content of 22 mole %, a saponification degree of 99.6 mole % and a polymerization degree of 600. Fifty (50) parts of a 10% solution of the modified EVOH in a 40/60 mixed solvent of water/ethyl alcohol was mixed with stirring and under heating at 70° C. with 140 parts of a 10% solution of an EVOH having an ethylene content of 27 mole %, a saponification degree of 99.4% and a polymerization degree of 900 in a 40/60 mixed solvent of water/ethyl alcohol.

The solution was then cooled to 8° C. with stirring to give a stable dispersion containing fine particles that formed and having a particle diameter of 0.5 μm. The ethyl alcohol was distilled off from the dispersion under reduced pressure with stirring at 25° C., to obtain a stable aqueous dispersion having a solid concentration of 23% and an average particle diameter of 0.5 μm. The dispersion was applied and dried in the same manner as in Example 1, to obtain a film (with an EVOH layer thickness of 3 μm). The oxygen barrier property of the film was found to be 1.3, which was good.

EXAMPLE 3

To 250 parts of an anion-modified EVOH comprising an EVOH having an ethylene content of 25 mole %, a saponification degree of 99.3 mole % and a polymerization degree of 400 and a copolymerization component of 0.8 mole % based on the EVOH component of sodium allylsulfonate, was added 1,900 parts of water and the mixture was dissolved to give a solution. To the obtained solution, 5,000 parts of a 10% solution of an EVOH having an ethylene content of 27 mole %, a saponification degree of 99.6 mole % and a polymerization degree of 1,100 in a 70/30 mixed solvent of isopropyl alcohol/water was added dropwise with stirring with high speed mixer steeped in the solution and at a rate of 5,000 rpm, to give a stable dispersion of fine particles that formed. The average particle size was found to be 0.91 μm.

The isopropyl alcohol was distilled off from the obtained dispersion at 20° C. under reduced pressure to obtain an aqueous dispersion having a solid concentration of 21%. The average particle diameter was found to be 0.9 μm. There was found little or no growth of particle size during the process of the distillation and a stable aqueous dispersion was obtained. The obtained aqueous dispersion was applied and dried in the same manner as in Example 1, to obtain a coated film (with an EVOH layer thickness of 3 μm). The oxygen permeability of the film was 3.5, which was good.

EXAMPLE 4

There was used a dispersion stabilizer of an anion-modified EVOH having an ethylene content of 38 mole %, a saponification degree of 99.6 mole % and a polymerization degree of 900 and having introduced by addition 4 mole % of sulfuric acid anion groups. This had been prepared by converting to sulfate ester groups the hydroxyl groups of the EVOH and then neutralizing ½ equivalent of the sulfuric acid group. There were mixed 420 parts of the anion-modified EVOH with 1,000 parts of a conventional EVOH having an ethylene content of 41 mole %, a saponification degree of 99.5 mole % and a polymerization degree of 900 and 1,000 parts of a 50/50 mixed solvent of methyl alcohol/water, and the mixture was dissolved by heating.

Thereafter, the solution was cooled to 15° C. with stirring and then fine particles formed and dispersed therein. The average particle diameter was found to be 0.8 μm. The methanol was evaporated off from the dispersion under reduced pressure, to obtain a stable aqueous dispersion. The solid concentration was 23% and the average particle diameter was 0.8 μm. The aqueous dispersion showed little or no sedimentation or aggregation of particles when allowed to stand at 40° C. for 10 days, thus proving its excellent stability.

EXAMPLE 5

There was used a dispersion stabilizer of a modified EVOH having an ethylene content of 33 mole %, a saponification degree of 99.6 mole % and a polymerization degree of 1,000 and having introduced by Michael's addition reaction to the hydroxyl groups 3 mole % based on the EVOH component of sodium 2-methacrylamide-2-methylpropanesulfonate. There was mixed 300 parts of this modified EVOH with 1,000 parts of a conventional EVOH having an ethylene content of 33 mole %, a saponification degree of 99.5 mole % and a polymerization degree of 1,010 and 10,000 parts of a 50/50 mixed solvent of methanol/water, and the mixture was dissolved by heating.

Dispersion and distilling off of methanol were conducted in the same manner as in Example 4, to obtain a stable aqueous dispersion having a solid concentration of 22% and an average particle diameter of 0.8 $\mu$m.

EXAMPLE 6

A carboxyl anion-modified EVOH having an ethylene content of 33 mole %, a saponification degree of 99.2 mole % and a polymerization degree of 700 and having random-copolymerized 6.0 mole % based on the EVOH component of sodium acrylate was prepared by copolymerization with sodium acrylate, followed by saponification. Example 1 was repeated except that the thus prepared anion-modified EVOH was used instead of the sulfonic acid anion-modified EVOH, to obtain an aqueous dispersion having a solid concentration of 23% and an average particle diameter of 0.8 $\mu$m. The aqueous dispersion, which showed aggregation of particles to a small extent, was applied and dried in the same manner as in Example 1, to obtain a coated film (thickness of EVOH layer: 3 $\mu$m). The film had an oxygen permeability of 6.0, which was good.

EXAMPLE 7

Example 6 was repeated except that an anion-modified EVOH having copolymerized 5.8 mole % based on the EVOH component of sodium itaconate was used instead of the anion-modified EVOH having copolymerized sodium acrylate, to obtain an aqueous dispersion having a solid concentration of 22% and an average particle diameter of 0.9 $\mu$m. The aqueous dispersion, which showed aggregation of particles to a small extent, was applied and dried in the same manner as in Example 1, to obtain a Coated film (thickness of EVOH layer: 3 $\mu$m). The film had an oxygen permeability of 5.7, which was good.

EXAMPLE 8

Example 7 was repeated except that the amount copolymerized of sodium itaconate was changed to 5.0 mole % and that the obtained anion-modified EVOH was used in an amount of 25 parts based on 100 parts of the conventional EVOH, to obtain an aqueous dispersion having a solid concentration of 24% and an average particle diameter of 0.7 $\mu$m.

EXAMPLE 9

Example 4 was repeated except that a carboxyl anion-modified EVOH obtained by addition reaction of phthalic anhydride, followed by neutralization, was used instead of the sulfonic acid anion-modified EVOH to which sulfuric acid had been added and neutralized, to obtain an aqueous dispersion having a solid concentration of 21% and an average particle diameter of 0.9 $\mu$m.

EXAMPLE 10

Example 3 was repeated except that there was used, instead of the sulfonic acid anion-modified EVOH having copolymerized sodium allylsulfonate, a cation-modified EVOH having copolymerized the same amount of trimethylacrylamide propylammonium chloride, to obtain an aqueous dispersion having a solid concentration of 22% and an average particle diameter of 0.8 $\mu$m.

SELF-DISPERSION

EXAMPLE 2-1

To 600 parts of a 30/70 mixed water/methyl alcohol solvent was added 50 parts of an sulfonic acid anion-modified EVOH (water-insoluble matter: 97%) comprising an EVOH having an ethylene content of 34 mole %, a saponification degree of 99.4 mole % and a polymerization degree of 1,100 and a copolymerization component of 0.5 mole % based on the EVOH component of sodium 2-acrylamide-2-methylpropanesulfonate and the mixture was heated with stirring to give a solution.

The solution was then cooled to 10° C. with stirring to give a stable dispersion containing fine particles that formed and having a particle diameter of 0.6 $\mu$m. The methyl alcohol was distilled off from the dispersion under reduced pressure with stirring at 20° C. During the distillation process, little aggregation of particles was observed and the obtained aqueous dispersion was stable. The average particle diameter was 0.6 $\mu$m and the solid concentration was 27%. The dispersion also showed a good storage stability and produced almost no visible aggregation when allowed to stand at 40° C. for 10 days.

The aqueous dispersion was applied to a primer-coated surface of a biaxially oriented polyethylene terephthalate film (thickness: 20 $\mu$m) and the film was dried at 80° C. for 5 minutes and further at 120° C. for 2 minutes. The film (thickness of EVOH layer: 5 $\mu$m) was then tested for oxygen barrier property, to show an oxygen permeability of 3.8, which was good for food packaging material.

It is understood from this Example that dispersion stability of EVOH in water increases markedly by introduction of the sulfonic acid anionic group according to the present invention and that the resulting EVOH can by itself be self-dispersed to give a stable aqueous dispersion.

EXAMPLE 2-2

An anion-modified EVOH was prepared by subjecting an EVOH having an ethylene content of 38 mole %, a saponification degree of 99.5 mole % and a polymerization degree of 1,100 to acetalization of its hydroxyl groups with sodium benzaldehyde-p-sulfonate to introduce 0.8 mole % based on the EVOH component of the sulfonate anion group. Example 2-1 was repeated except that the anion-modified EVOH thus prepared (water-insoluble matter: 94%) was used, to obtain an aqueous dispersion having a solid concentration of 23% and an average particle diameter of 0.9 $\mu$m. The dispersion, which showed aggregation of particles to a small extent, was applied and dried in the same manner as in Example 2-1, to obtain a film (thickness of EVOH layer: 5 $\mu$m).

The film had an oxygen permeability of 5.1, which was good.

EXAMPLE 3-1

A high-pressure polymerization vessel was charged with 1,340 parts of vinyl acetate, 84 parts of methanol and 0.23 part of sodium 3-mercaptopropanate. After the air inside the vessel had been sufficiently replaced by nitrogen, ethylene gas was fed. The internal conditions of the vessel were controlled at a temperature of 60° C. and an ethylene pressure of 41 kg/cm²G, and then 1.07 parts of 2,2'-azobisisobutyronitrile as polymerization initiator was added, and further a solution of sodium 3-mercaptopropanate in methanol (concentration: 2%) was continuously added over 3.8 hours at a rate of 38.4 parts/hour, to effect polymerization. The conversion of vinyl acetate was 39%.

After the vessel had been cooled the vessel, ethylene gas was removed and, while methanol was being added, unreacted vinyl acetate was purged out from the system under reduced pressure, to obtain a solution of an ethylene-vinyl acetate copolymer in methanol. The obtained solution was fed into a tower type saponification reactor, and sodium hydroxide was added in such an amount as to make its molar ratio 0.03 based on the moles of the vinyl acetate units in the copolymer. Thereafter, saponification reaction was carried out at 120° C. by blowing methanol vapor from the bottom of the reactor, while the methyl acetate that formed was being removed from the top of the tower reactor. Steam was then blown into the obtained EVOH solution in methanol to change the solvent composition of the solution into a mixed system of water and methanol. Then the solution was extruded into a bath comprising a 10% aqueous methanol solution at 5° C. to form strands. The strands were coagulated and separated, and cut. The obtained cut chips were sufficiently washed with distilled water, hot-air dried at 60° C. for 5 hours and further vacuum dried at 100° C. for 12 hours.

The obtained EVOH was dissolved in a mixed solvent of $d_6$-DMSO (deuterated dimethyl sulfoxide) and $CD_3OD$ (deuterated methyl alcohol). The solution was analyzed by $^1H$-NMR spectroscopy and found to be a terminal-ion-modified EVOH having sodium carboxylate at the molecular end and having an insoluble matter content of 99%, the EVOH component having an ethylene content of 32 mole %, a saponification degree of 99.9 mole % and a polymerization degree of 430. The melting point observed by DSC (differential scanning calorimetry) at a temperature elevation rate of 10° C./min (hereinafter the melting point determined by this method will be referred to simply as "melting point") was 182° C.

In 600 parts of a 30/70 mixed solvent of water/methanol, 50 parts of the terminal-ion-modified EVOH thus obtained was dissolved by heating at 65° C. The obtained solution was cooled with stirring down to room temperature. Then particles formed and a stable dispersion was obtained. The average particle diameter was found to be 0.9 μm. The dispersion was subjected to evaporation under reduced pressure at 20° C. with stirring to distill off methyl alcohol. There was found little or no aggregation of the particles during the distillation process and an aqueous dispersion having an average particle diameter of 0.9 μm and a solid concentration of 24% was obtained. The obtained aqueous dispersion had a good storage stability and showed little or no aggregation when allowed to stand at 40° C. for 10 days.

It is understood that use of the terminal-ion-modified EVOH according to the present invention realizes production of stable aqueous dispersions, thanks to the marked dispersion stabilization effect produced by the ionic group bonded to the molecular end. The obtained aqueous dispersion was applied on the primer coated surface of biaxially oriented polypropylene film (film thickness: 20 μm), and the film was dried at 70° C. for 5 minutes, to form a neat continuous coating layer, thus proving excellent film formability. The film was then heat treated at 150° C. for 30 seconds (thickness of EVOH layer: 5 μm) and tested for oxygen barrier property. The oxygen permeability was 3.4, which was good for for food packaging material.

EXAMPLE 3-2

In 290 parts of methanol there were dissolved at room temperature 91 parts of 2-acrylamide-2-methylpropansulfonic acid, 16 parts of sodium hydroxide and 0.06 part of benzoyl peroxide. Then the oxygen inside the zone was replaced by nitrogen. While the inside temperature was maintained at 15° to 20° C., thioacetic acid was continuously added at a rate of 2 parts/min over 80 minutes and then the inside temperature was elevated to 65° C. and the reaction mixture was refluxed for 4 hours. The inside temperature was decreased to 40° C. and thioacetic acid and methanol were distilled off under reduced pressure, to obtain a white powder. In 300 parts of methanol, 100 parts of the white powder was dissolved. To the solution was added 4 parts of sodium hydroxide and the mixture was heated at 40° C. for 3 hours under a stream of nitrogen. Then, 6 parts of acetic acid was added to the obtained solution, and the methanol was distilled off at an inside temperature of 35° C. under reduced pressure, to obtain a thiolized compound of 2-acrylamide-2-methylpropanesulfonic acid. It was confirmed by oxidation-reduction titration that the thiolization had been conducted quantitatively.

A high-pressure polymerization vessel was charged with 1,090 parts of vinyl acetate, 105 parts of methanol and 0.25 part of the sodium salt obtained by neutralization of the thiolized compound of 2-acrylamide-2-methylpropanesulfonic acid. After thorough replacement of the air inside the vessel by nitrogen, ethylene was blown into. After the internal conditions of the vessel had been controlled at a temperature of 60° C. and an ethylene pressure of 30 kg/cm²G, 1.53 parts of 2,2'-azobisisobutyronitrile as a polymerization initiator was added and further a solution in methanol of the above thiolized compound of sodium 2-acrylamide-2-methylpropanesulfonate (concentration: 18%) was continuously added at a rate of 14.4 parts/hour over 3.4 hours, to effect polymerization. The conversion of vinyl acetate was 40%.

In-the same manner as in Example 3-1, removal of unreacted ethylene and vinyl acetate, saponification, coagulation, cutting and washing with distilled water were conducted. The chips were further washed with an 0.5 g/liter aqueous acetic acid solution and then dred, to give a terminal-ion-modified EVOH having a sulfonic acid group at the molecular end and having an ethylene content of 25 mole %, a saponification degree of 99.3 mole %, a polymerization degree of 700, a melting point of 193° CC. and a water-insoluble matter content of 97%.

In 500 parts of a 40/60 mixed solvent of water/methanol, 50 parts of the terminal-ion-modified EVOH thus obtained was dissolved by heating at 70° C. The obtained solution was cooled with stirring down to room temperature. Then particles formed and a stable dispersion was obtained. The average particle diameter was found to be 0.8 μm. The dispersion was subjected to evaporation under reduced pressure at 25° C. with stirring to distill off methyl alcohol. There was found little or no aggregation of the particles during the distillation process and an aqueous dispersion having an average particle diameter of 0.8 μm and a solid concentration of 26% was obtained. The obtained aqueous dispersion was applied and dried in the same manner as in Example 3-1, to obtain a film (thickness of EVOH layer: 5 μm). The film showed an oxygen permeability of 2.6, which means excellent gas barrier property.

EXAMPLE 3-3

A thiol having an ammonium chloride group was prepared, in the same manner as in Example 3-2, by conducting addition reaction of trimethyl(3-methacrylamide)ammonium chloride with thioacetic acid in the presence of benzoyl peroxide, followed by saponification of the product with sodium hydroxide.

A high-pressure polymerization vessel was charged with 990 parts of vinyl acetate, 120 parts of methanol and 0.17 part of the thiolized compound of trimethyl(3-methacrylamide)ammonium chloride. After thorough replacement of the air inside the vessel by nitrogen, ethylene was blown into. After the internal conditions of the vessel had been controlled at a temperature of 60° C. and an ethylene pressure of 61 kg/cm$^2$G, 6.2 parts a polymerization initiator 2,2'-azobis-(2,4-dimethylvaleronitrile) was added and further a solution in methanol of the above thiol containing ammonium chloride group (concentration: 5%) was continuously added at a rate of 39.4 parts/hour over 3.3 hours, to effect polymerization. The conversion of vinyl acetate was 38%. In the same manner as in Example 3-1, removal of unreacted ethylene and vinyl acetate, saponification, coagulation, cutting, washing with distilled water and drying were conducted, to obtain a terminal-ion-modified EVOH having an ammonium chloride group at the molecular end and having a polymerization degree of 400, an ethylene content of 48 mole a saponification degree of 99.2 mole %, a melting point of 157° C., and a water-insoluble matter content of 98%.

In 1,000 parts of a 20/80 mixed solvent of water/isopropyl alcohol was dissolved 50 parts of the obtained terminal-ion-modified EVOH by heating at 65° C. to give a solution. The obtained solution was cooled with stirring to room temperature to give a stable dispersion of particles having an average particle diameter of 0.8 μm. The solution was subjected to evaporation under reduced pressure with stirring and at 30° C. Isopropyl alcohol was removed by this operation and a stable aqueous dispersion having an average particle diameter of 0.8 μm and a solid concentration of 22%. The obtained aqueous dispersion was applied and dried in the same manner as in Example 3-1, to obtain a coated film (thickness of EVOH layer: 5 μm) The film showed an oxygen permeability of 8.0, which was good.

EXAMPLE 4-1

Production process (A)-(i) was employed as follows. Thioacetic acid and a polyoxyethylene allyl ether having a double bond at the molecular end and having a molecular weight of 450 (UNIOX PKA-5,003, made by Nippon Oil & Fats Co., Ltd.) were subjected to addition reaction in the presence of benzoyl peroxide, to obtain a polyether having a thioester group at the molecular end. The polyether was hydrolyzed with sodium hydroxide to give a polyether having a thiol group at the molecular end. Ethylene and vinyl acetate were copolymerized in the presence of the obtained polyether as a chain transfer agent. The resulting block copolymer was then saponified, to give a polyether-modified EVOH block copolymer comprising 100 parts by weight of EVOH component (A) having an ethylene content of 32 mole %, saponification degree of 99.6 mole % and a polymerization degree of 700 and, linked to the molecular end thereof via S, 8 parts of the polyether component (B) The water-insoluble matter of the copolymer as it was immersed in water at 30° C. in a concentration of 1% and for one day (hereinafter the water-soluble matter determined by this method is referred to simply as "water-insoluble matter") was 95%.

In 600 parts of a 30/70 mixed solvent of water/methanol, 50 parts of the obtained polyether-modified EVOH block copolymer was dissolved by heating at 65° C. to give a solution. The solution was cooled with stirring to room temperature, to give a stable dispersion with fine particles that formed. The average particle diameter was 0.7 μm. The dispersion was then subjected to evaporation under reduced pressure with stirring to distill off methanol. There was little or no aggregation of particles during the evaporation process, and an aqueous dispersion having an average particle diameter of 0.7 μm and a solid concentration of 23% was obtained. The obtained aqueous dispersion had a good storage stability and also showed little or no aggregation when allowed to stand at 40° C. for 10 days.

It is understood that use of the polyether-modified EVOH according to the present invention realizes production of stable aqueous dispersions, thanks to the marked dispersion stabilization effect produced by the polyether component linked block-wise to the EVOH component. The obtained aqueous dispersion was applied on the primer coated surface of a biaxially oriented nylon 6 film (film thickness: 20 μm), and the film was dried, to form a continuous coating layer neatly, thus proving excellent film formability. The film (thickness of EVOH layer: 5 μm) was dried at 100° C. for 3 minutes and further at 130° C. for 1 minute, and then tested for oxygen barrier property. The oxygen permeability was 3.3, which was good for food packaging material.

EXAMPLE 4-2

The production process (B)-(a) was employed as follows. An allyl ether having a double bond at the molecular end and a molecular weight of 750 and comprising oxyethylene units and oxypropylene units in a molar ratio of 75/25 (UNISAFE PKA-5011, made by Nippon Oil and Fats Co., Ltd.) was copolymerized with ethylene and vinyl acetate, and the resulting copolymer was then saponified to give a polyether-modified EVOH graft copolymer comprising 100 parts by weight of EVOH component (A) having an ethylene content of 48 mole %, a saponification degree of 99.2 mole % and a polymerization degree of 750 and, bonded graft-wise thereto, 5 parts by weight of the polyether component. The copolymer had a water-insoluble matter of 96%.

In 900 parts of a 20/80 mixed solvent of water/isopropyl alcohol, 50 parts of the obtained polyether-modified EVOH graft copolymer was dissolved by heating at 70° C. to give a solution. The solution was cooled with stirring to room temperature, to give a stable dispersion having an average particle diameter of 0.5 μm. The dispersion was then subjected to evaporation under reduced pressure with stirring to distill off isopropyl alcohol, to give an aqueous dispersion having an average particle diameter of 0.5 μm and a solid concentration of 24%. The obtained aqueous dispersion was applied and dried in the same manner as in Example 4-1, to obtain a coated film. The film (thickness of EVOH layer: 5 μm) showed an oxygen permeability of 6.0, thus proving excellent gas barrier property of the modified EVOH.

EXAMPLE 5-1

There was prepared a sulfonic acid anion-modified EVOH comprising an EVOH component having an ethylene content of 29 mole %, a saponification degree of 99.8 mole % and a polymerization degree of 200 and, random-copolymerized therewith, 8 mole % based on the EVOH component of sodium 2-acrylamide-2-methylpropanesulfonate. In a mixed solvent of 345 parts of methanol and 345 parts of water, were dissolved 5 parts of the thus obtained modified EVOH, 70 parts of a conventional EVOH having an ethylene content of 28 mole %, a saponification degree of 99.8 mole % and a polymerization degree of 1,100 and 0.15 part of sodium chloride.

The obtained solution was cooled to room temperature with stirring to give a stable dispersion with particles that formed. Then the methanol in the dispersion was distilled off, to obtain an aqueous dispersion (A) having an average particle diameter of 0.9 μm and a solid concentration of 20%. This aqueous dispersion was found to have a viscosity of 15 cps (at 30° C. The dispersion was applied and dried in the same manner as in Example 1, to obtain a coated film (thickness of EVOH layer: 3 μm), which showed a good oxygen permeability of 7.5.

Separately, the above experiment was repeated except that sodium chloride was not added, to obtain an aqueous dispersion (B) having an average particle diameter of 0.9 μm and a solid concentration of 19%. The obtained aqueous dispersion had a comparatively high viscosity of 200 cps (at 30° C.).

Both of the above aqueous dispersions can be used for practical purposes, with the former (A) being more suited for those uses that require lower viscosity.

EXAMPLE 5-2

A terminal-ion-modified EVOH comprising EVOH component having an ethylene content of 30 mole %, a saponification degree of 99.1 mole % and a polymerization degree of 240 and, at the molecular end thereof, sodium (2-acrylamide-2-methylpropanesulfanate) was obtained by the process described in Example 3-2. Example 1 was repeated except that the thus obtained sulfonate anion-modified EVOH was used instead of that used in Example 1, to obtain an aqueous dispersion having an average particle diameter of 0.9 μm and a solid concentration of 28%. The dispersion had good storage stability and showed almost no aggregation of particles when allowed to stand at 40° C. for 10 days.

The aqueous dispersion was applied on the primer-coated surface of a biaxially oriented polyethylene terephthalate film (thickness: 20 μm) and dried at 110° C. for 3 minutes. The coated film (thickness of EVOH layer: 5 μm) was tested for oxygen gas barrier property, to show an oxygen permeability of 2.8, which is good for food packaging purpose.

INDUSTRIAL APPLICABILITY

As described heretofore, the aqueous dispersions of the present invention with high solid concentration and having superior stability during storage and upon use are obtained by using specific ion-modified EVOH's as dispersion stabilizers. The aqueous dispersions, being of aqueous nature, causes no environmental pollution problem and can be applicable to various substrates, to form, upon drying, thin films having excellent gas barrier properties, fragrance retention, and good resistance to oil and chemicals.

Suitable examples of the substrates include various shaped articles such as films, sheets, cups and bottles comprising thermoplastic resins, e.g. polyolefins, such as polyethylene and polypropylene, polyesters, polyamides, polyvinyl chlorides, polyvinylidene chlorides, polycarbonates, polystyrene, polyvinyl alcohol and vinyl acetate resins such as ethylene-vinyl acetate copolymers, and also include fibrous aggregate, such as paper, nonwoven fabrics, woven fabrics and fibrous casings, inorganic materials such as cement, metals, polyvinyl chloride wall papers, photographic papers and the like.

The aqueous dispersion of the present invention can be applied on the surface of substrates by various processes, including extrusion from casting head, roll coating, doctor-knife coating, curtain flow coating, spraying, immersion, brushing and the like. The dispersion applied by any of the above processes is dried and heat treated by dry heat system, such as infrared heating or hot air drying. These dry heating processes can be used singly or in combination. The temperature of drying and heat treatment is generally in a range of 30° to 180° C. With respect to the lower limit, the temperature is preferably at least 50° C., more preferably at least 80° C. The drying and heat treatment time is preferably in a range of 5 seconds to 10 minutes, more preferably in a range of 1 minute to 5 minutes. During drying and heat treatment, there is no particular limitation to changing the conditions. For instance, one may start the treatment starting at a low temperature and gradually increase the temperature. By the drying and heat treatment processes, coating membranes having superior gas barrier properties can be formed on the surface of the substrates. The thickness of the layer formed by application and drying and heat treatment of the aqueous dispersion of the present invention is preferably 0.5 to 15 μm, more preferably 1 to 10 μm and most preferably 2 to 6 μm.

What is claimed is:

1. An aqueous dispersion comprising a dispersoid of an ethylene-vinyl alcohol copolymer having an, ethylene content of 15 to 65 mole % and a dispersion stabilizer of a saponified product of an ethylene-vinyl ester copolymer having an ionic group and having an ethylene content of 10 to 70 mole % and a saponification degree of at least 80%.

* * * * *